US012679203B2

(12) United States Patent
Dennis

(10) Patent No.: US 12,679,203 B2
(45) Date of Patent: Jul. 14, 2026

---

(54) ALERT ATTENUATOR AND METHOD FOR MANAGING ALERTS

(71) Applicant: Blue Eye Technology Pty Ltd, Sylvania (AU)

(72) Inventor: Matt Dennis, Sylvania (AU)

(73) Assignee: Blue Eye Technology Pte Ltd, Sylvania (AU)

( * ) Notice: Subject to any disclaimer, the term of this patent is extended or adjusted under 35 U.S.C. 154(b) by 319 days.

(21) Appl. No.: 18/252,797

(22) PCT Filed: Nov. 12, 2021

(86) PCT No.: PCT/AU2021/051349
§ 371 (c)(1),
(2) Date: Oct. 2, 2023

(87) PCT Pub. No.: WO2022/099378
PCT Pub. Date: May 19, 2022

(65) Prior Publication Data
US 2024/0208328 A1 Jun. 27, 2024

(30) Foreign Application Priority Data
Nov. 12, 2020 (AU) ................................. 2020904160

(51) Int. Cl.
*B60K 31/18* (2006.01)
*B60K 35/10* (2024.01)
(Continued)

(52) U.S. Cl.
CPC .............. *B60K 31/18* (2013.01); *B60K 35/10* (2024.01); *B60K 35/22* (2024.01); *B60K 35/26* (2024.01);
(Continued)

(58) Field of Classification Search
CPC ........ B60K 31/18; B60K 35/26; B60K 35/22; B60K 2360/178
See application file for complete search history.

(56) References Cited

U.S. PATENT DOCUMENTS 3,611,344 A * 10/1971 Couper ................. B60T 11/103
123/198 DC
4,956,866 A * 9/1990 Bernstein ................. B60Q 1/52
704/274
(Continued)

FOREIGN PATENT DOCUMENTS

CN 106740110 A 5/2017
CN 111009137 A 4/2020
(Continued)

OTHER PUBLICATIONS

Extended European Search Report for Patent Application No. 218904100 of Dec. 11, 2024.
(Continued)

*Primary Examiner* — Chico A Foxx
(74) *Attorney, Agent, or Firm* — Perilla Knox & Hildebrandt LLP; Kenneth A. Knox; Stephanie L. Davy-Jow

(57) ABSTRACT

A vehicle alert management system that manages alert lights and tones in accordance with vehicle speed and other inputs is described. The vehicle alert management system is configured so that in use the alert management system attenuates an alert lamp or click or tone after a selected time interval if the system detects that vehicle speed is below a selected speed or within a selected threshold, or if the system detects no change outside a threshold speed range, or other suitable speed algorithm. The system in embodiments is configured to attenuate the in-vehicle cabin sound associated with a direction indicator on a vehicle so that it is inhibited
(Continued)

after a selected time period, and allowed to play in the cabin after the vehicle speed moves out of a selected threshold range.

20 Claims, 6 Drawing Sheets

(51) Int. Cl.

| | |
|---|---|
| *B60K 35/22* | (2024.01) |
| *B60K 35/26* | (2024.01) |
| *B60K 35/28* | (2024.01) |
| *B60K 35/29* | (2024.01) |

(52) U.S. Cl.
CPC .............. *B60K 35/28* (2024.01); *B60K 35/29* (2024.01); *B60K 2360/178* (2024.01)

(56) References Cited

U.S. PATENT DOCUMENTS

| | | | | |
|---|---|---|---|---|
| 5,272,464 | A * | 12/1993 | Jorgensen | ........... B60R 16/0373 340/459 |
| 5,954,781 | A * | 9/1999 | Slepian | .................. B60K 28/00 340/425.5 |
| 6,037,862 | A * | 3/2000 | Ying | ....................... B60K 31/18 340/461 |
| 6,359,558 | B1 * | 3/2002 | Tsui | ..................... G08B 25/009 367/197 |
| 6,501,374 | B1 * | 12/2002 | King | ....................... B60R 22/48 340/459 |
| 6,864,784 | B1 | 3/2005 | Loeb | |
| 7,061,375 | B2 * | 6/2006 | Koike | ..................... B60R 22/48 340/425.5 |
| 10,452,257 | B2 * | 10/2019 | Kim | ....................... B60W 50/16 |
| 10,783,725 | B1 * | 9/2020 | Gaudin | .................. G07C 5/008 |
| 11,334,709 | B2 * | 5/2022 | Baracaldo-Angel | ........................ G06F 40/117 |
| 2001/0012976 | A1 * | 8/2001 | Menig | ..................... B60K 35/60 701/1 |
| 2002/0105418 | A1 * | 8/2002 | Yurimoto | .............. G08G 1/161 340/436 |
| 2004/0178902 | A1 * | 9/2004 | Koike | .................... B60R 22/48 340/457.1 |
| 2005/0083211 | A1 | 4/2005 | Shafin | |
| 2011/0032093 | A1 | 2/2011 | Miller | |
| 2016/0347241 | A1 | 12/2016 | Gralto | |
| 2020/0062081 | A1 * | 2/2020 | Curry | ................ B60H 1/00828 |
| 2020/0130577 | A1 | 4/2020 | Mitra et al. | |
| 2020/0198561 | A1 * | 6/2020 | Weed | ..................... B60R 16/03 |
| 2021/0029455 | A1 * | 1/2021 | Wu | ..................... B60R 11/0217 |
| 2021/0211814 | A1 * | 7/2021 | Tripathi | ............... H04R 25/554 |
| 2021/0379992 | A1 * | 12/2021 | Domeyer | .............. B60K 35/28 |
| 2023/0349704 | A1 * | 11/2023 | Quint | .............. G08G 1/096716 |

FOREIGN PATENT DOCUMENTS

| | | | | | |
|---|---|---|---|---|---|
| CN | 119261783 | A | * | 1/2025 | ............. B60K 31/18 |
| EP | 3416152 | A1 | * | 12/2018 | ............. G08G 1/054 |
| EP | 3839518 | A1 | * | 6/2021 | ............. G01P 1/122 |
| JP | 1986108023 | A | | 5/1986 | |
| JP | H0581771 | U | * | 11/1993 | |
| JP | 2004086524 | A | | 3/2004 | |
| JP | 2019070874 | A | | 5/2019 | |

OTHER PUBLICATIONS

Office Action for JP Patent Application No. 2023528669 of Jul. 10, 2025.

* cited by examiner

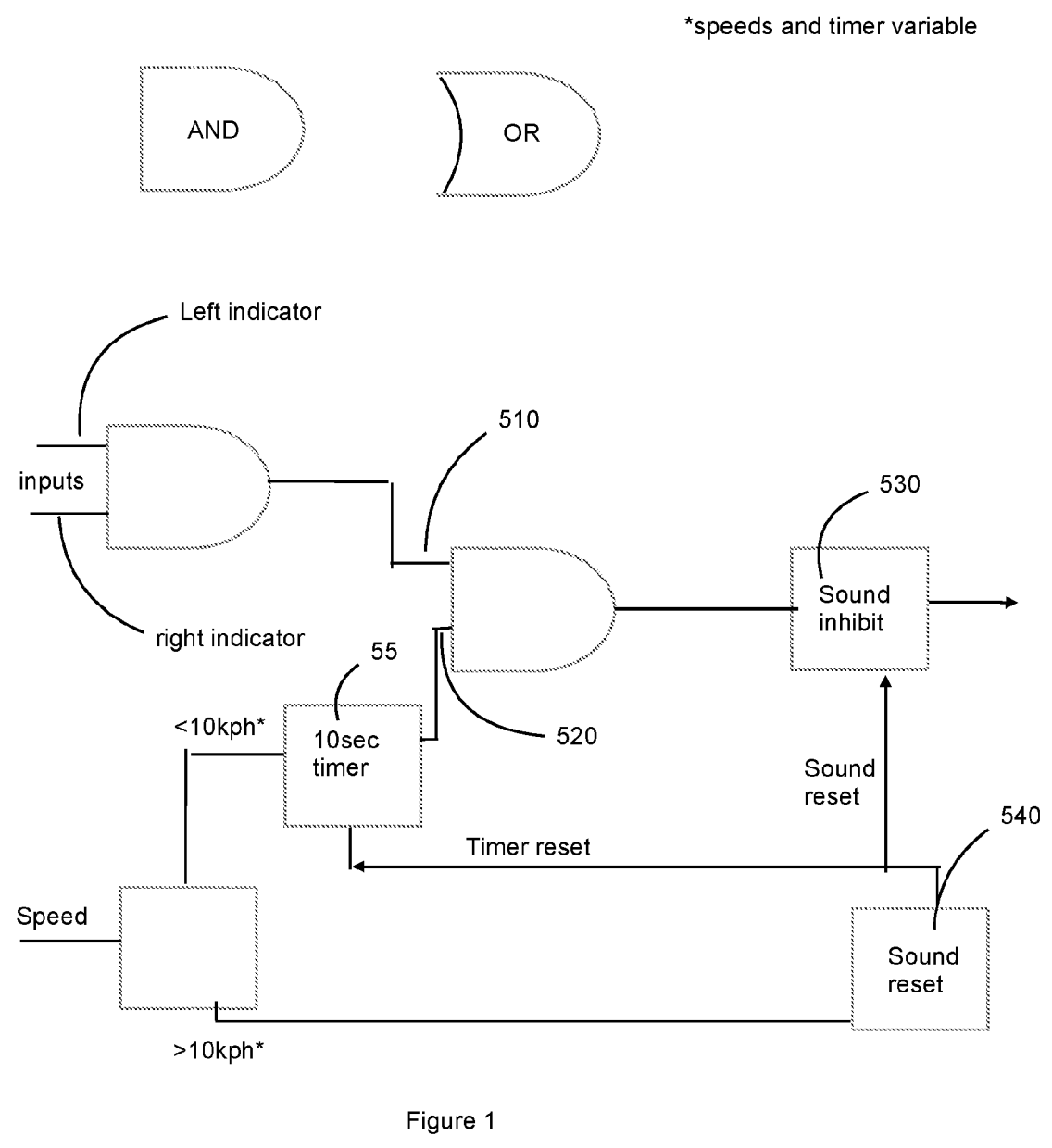

*speeds and timer variable

AND

OR

Left indicator inputs

510

530 right indicator

55

520

Sound
inhibit

10sec
timer

<10kph*

Sound
reset

Speed

Timer reset

540

Sound
reset

>10kph*

Figure 1

ALERT ATTENUATOR AND METHOD FOR MANAGING ALERTS

CROSS-REFERENCE TO RELATED APPLICATIONS

This application is a 371 U.S. National Stage Application of PCT Application Serial Number PCT/AU2021/051349 filed on Nov. 12, 2021, which application claims the benefit of and priority to Australian Application No. 2020904160, filed Nov. 12, 2020, the entire contents of each of which are hereby incorporated herein by reference.

TECHNICAL FIELD

The present technology relates generally to a noise or light manger for use in a vehicle to attenuate noise and/or light created by alert, signal, and other audio or light alert systems.

BACKGROUND

Vehicle signal and alert systems are designed to cut through background and other noises which are incident on a driver from inside and outside the vehicle. Research has shown that the most noticeable, or even the most piercing, noises are tonal in nature and/or repetitive. So it is that signal and alert systems are usually tonal and/or repetitive.

But a balance must be struck. While it is useful that these tonal and/or repetitive vehicle light and audio signal and alert systems are noticeable, they can be very irritating to a driver.

An irritated driver has reduced patience, and is likely to have, at least temporarily, reduced driving skills. A tonal and/or repetitive noise can be another distraction, and one which may take additional mental strength with which to cope; mental strength that should be devoted to driving.

The present inventor seeks to provide a light and/or noise attenuation and management system and method, and/or which at least provides a useful alternative to known light and/or noise management systems.

SUMMARY

Broadly, the present technology provides a vehicle alert management system that manages alert tones and alert lights taking account of a change in vehicle speed.

Broadly, the present technology provides a vehicle alert management system that manages alert lights and/or tones in accordance with a time elapsed since actuation and/or change in vehicle speed relative to a threshold speed window.

The arrangement is such that in use the alert management system attenuates an alert tone or light after a selected time interval if the system detects that vehicle speed is below a selected level, or within a selected threshold, or if the system detects no change outside a threshold speed range, or other suitable speed algorithm.

In accordance with one aspect of the present technology there is provided a method of managing light or sound relating to a vehicle signal or alarm, the method including the steps of:
 receiving data, in a computer processor, from a signal actuator related to a vehicle action;
 receiving data, in a computer processor, from a speed sensor or input;

sending a data signal to inhibit a cabin light or sound related to the signal actuator to a lamp or amplifier or sound system or speaker based on a selected change in vehicle speed over a selected time period.

In accordance with another aspect of the present technology there is provided a system for managing light or sound relating to a vehicle signal or alarm, the system including:
 a computer processor;
 one or more data inputs to the computer processor relating to a user actuator for a vehicle operation;
 one or more data inputs to the computer processor relating to a speed sensor;
 one or more data inputs to the computer processor from a timer or an internal timer;
 a data output to a light actuator or sound amplifier or sound system or speaker;
 the computer processor being configured to transmit from the data output, a light or sound inhibiting command to the light actuator, amplifier or sound system or speaker if the processor receives data relating to the speed sensor and timer that vehicle speed has been below a selected speed or within a selected threshold for a selected period of time, or if the computer processor calculates that the speed data from the speed sensor has been within a selected threshold speed range over a selected period of time, or in accordance with another suitable speed algorithm.

In accordance with yet another aspect of the present invention there is provided a system that manages one or more lights and/or sounds relating to a vehicle signal or alarm, the system including:
 one or more noise generator; and
 one or more light sources.

In one embodiment the system includes a computer processor to record the length of time that the noise generator or alert or alarm has been actuated.

In one embodiment the system includes a random number generator to provide input to a muting system or attenuation system, or other noise generator system.

In accordance with still another aspect of the present invention there is provided a method of managing one or more vehicle alerts, the method including the steps of:
 actuating a noise generator; and
 actuating a light source;
 the actuation of the noise generator and the one or more light sources being in accordance with an algorithm.

In one embodiment the algorithm includes a noise monitoring routine to assess the volume of a selected alert.

In one embodiment the noise monitoring routine records the length of time that the selected alert has been in operation.

In one embodiment the method includes the step of increasing and decreasing and muting the noise from the noise generator, after 5 seconds, 10 seconds, 15 seconds, 20 seconds, 30 seconds.

In one embodiment the method includes the step of counting a number of repetitive noise events, including a tick, beep, tock, dong, clang, and the like.

In one embodiment the algorithm includes attenuating, increasing or muting the selected alert after a selected number of dings, tocks, ticks, beeps, clangs, or other sound events.

In one embodiment the method includes the step of attenuating or increasing or muting the sound every second beep, or every third beep, or every fourth beep.

In one embodiment the method includes the step of attenuating or increasing or muting the sound after a random number of beeps, ticks, tocks, or the like.

The management system includes the introduction of, change of, deletion of—varying noise levels, change of noise, visual alert, or any item that could be classed as a warning or alert.

In one embodiment the method includes the steps of:
recording the time of alert commencement;
commencing a timer from the time of alert receipt;
silencing the alert for a selected period of time; and then
increasing the volume of the alert after the selected period of time or after a threshold speed range has been exceeded.

In one embodiment the method includes the step of assigning a weight to selected alerts for use in an alert prioritisation algorithm.

In one embodiment the method includes the step of implementing an alert prioritisation algorithm such that alerts with a higher weighting are re-activated before other alerts.

In one embodiment the method includes the step of re-actuating alerts with a higher weight earlier than alerts with a lower weighting.

In one embodiment the method includes the step of silencing alerts with a lower weight for longer than alerts with a higher weighting in the alert prioritisation algorithm.

In one embodiment the indicator alert has a high weighting in the alert prioritisation algorithm.

In one embodiment an indicator alert has a weighting of 0.5 in the alert prioritisation algorithm.

In one embodiment a hazard light alert has a weighting of 0.8 in the alert prioritisation algorithm.

In one embodiment a proximity alert has a weighting of 0.9 in the alert prioritisation algorithm.

In one embodiment the algorithm re-actuates alerts after a selected number of seconds and then re-silences the alerts after another selected number of seconds.

In one embodiment the processor records the number of re-actuations and reduces the silencing time unless there has been a change in one of the recorded conditions relating to that alert, such as for example, speed, or temperature, or steering angle, or proximity to another vehicle.

In one embodiment the method further includes the step of sending a pass-through command to the light actuator, sound system or speaker or amplifier if a further data signal is received.

In one embodiment the method further includes the step of sending a pass-through command to the light actuator, sound system or speaker or amplifier if the computer processor calculates that the speed data from the speed sensor is outside the selected threshold speed range.

In one embodiment the method further includes the step of sending a pass-through command to the light actuator, sound system or speaker or amplifier if the computer processor calculates that the inhibiting command has been inhibiting the sound for more than a selected time period.

In accordance with yet another aspect of the present technology there is provided a system for managing and/or attenuating light and/or sound relating to a vehicle signal or alarm, the system including:
a computer processor;
one or more data inputs to the computer processor from a user actuator for a vehicle operation;
one or more data inputs to the computer processor from a timer or an internal timer;

a data output to a lamp, sound amplifier or sound system or speaker;
the computer processor being configured to transmit from the data output, a light and/or sound inhibiting command to the amplifier or sound system or speaker if the processor receives data from the timer that a selected time period has elapsed since the actuator for the vehicle operation was actuated.

In accordance with a yet further aspect of the present technology there is provided a method of managing and/or attenuating light and/or sound relating to a vehicle signal or alarm, the method including the steps of:
receiving data, in a computer processor, from a signal actuator for a vehicle action;
receiving data, in a computer processor, from a timer;
inhibiting a cabin light or sound related to the signal actuator, to an amplifier or sound system or speaker based on a selected length of time since the actuator for the vehicle action was actuated.

The arrangement of the system may be such that the processor is attached to a car as an aftermarket unit, such that the data from the signal actuator may be directly from the actuator or may be attached to an outlet port of a computer processor which manages vehicle operations. In that instance, the computer processor may receive data relating to the signal actuator from the computer processor manager of vehicle operations, rather than from the signal actuator itself.

The method of the present technology may be implemented as code amendments to the onboard diagnostic computer or other existing CPU on board a vehicle.

In accordance with a yet further aspect of the present technology there is provided a method of managing and/or attenuating sound relating to a vehicle signal or alarm, the method including the steps of:
receiving data, in a computer processor, relating to an active status of one or more signal actuators for a vehicle action;
receiving data, in a computer processor, relating to a timer;
initiating a light and/or sound inhibiting command related to the one or more active signal actuators to a light actuator, an amplifier or sound system or speaker based on a selected length of time since the actuator for the vehicle action was actuated.

In an emergency, such as a crash, or an emergency braking situation, the OBD or other CPU on board may transmit or otherwise send a signal to allow the signal to pass through the inhibitor so that the alert tone or light may play uninhibited. For example, a signal from an on board accelerometer or brake pedal or ABS actuator, overrides the inhibitor of the present technology and allows all signals to pass through.

In accordance with still another aspect of the present technology there is provided a system for managing and/or attenuating light and/or sound relating to a vehicle signal or alarm, the system including:
a computer processor;
one or more data inputs to the computer processor from a user actuator for a vehicle operation;
one or more data inputs to the computer processor from a speed sensor;
one or more data inputs to the computer processor from a timer or an internal timer;
a data output to a lamp or sound amplifier or sound system or speaker;

5                                                                                                                      6 the computer processor being configured to transmit from the data output, a light and/or sound inhibiting command to the lamp actuator module, amplifier or sound system or speaker if the processor receives data from the speed sensor and timer that vehicle speed has been below a selected speed or within a selected threshold for a selected period of time, or if the computer processor calculates that the speed data from the speed sensor has been within a selected threshold speed range over a selected period of time, or in accordance with another suitable speed algorithm.

In one embodiment the data relating to a speed sensor is from an onboard GPS.

In one embodiment the method further includes the step of receiving data from an onboard GPS to inform the decision relating to sound inhibiting by the computer processor.

In one embodiment the data relating to speed, or relating to a speed sensor, or from a speed sensor, is from an onboard IMU or accelerometer.

In one embodiment the computer processor receives data from an onboard gyroscope, to calculate whether a vehicle action has been taken to inform the sound inhibiting command decision.

In one embodiment the method further includes the step of receiving data from an onboard gyroscope, to calculate in the computer processor whether a vehicle action has been taken and/or to inform the sound inhibiting command decision.

In one embodiment the data inputs are from an OBD (on board diagnostic) plug.

In one embodiment the data inputs are via a wireless or wired network card which is connected directly or indirectly to the OBD plug.

In one embodiment the system includes a network module.

In one embodiment the method further includes the step of receiving information from a data service.

In one embodiment the method further includes the step of receiving information from on-board memory.

Advantages

Advantageously, embodiments of the system manage the sound output associated with actuation of one or more vehicle signals or alarms depending on the speed variation of the vehicle, and/or the length of time that they have been active.

For example, if a person actuates the vehicle indicator light, the cabin noise alert tone wave will be actuated for a selected time (say 10 seconds) but then will be silenced by the system and the method, until the speed of the vehicle changes out of a selected threshold range, or until the cabin noise alert has been silenced for a selected time period (say 1 or 2 minutes).

Advantageously, embodiments of the management system in operation can reduce work load on the user which would otherwise be put into turning off alarms or alerts, and also improves safety for other road users. This is because the operator of vehicles will not be stressed from the alert response of their vehicles, which may cause them to lose control of their vehicle. Sometimes the response of a user to an irritating alert is to turn off the alert or turn off the feature that causes the alert. In one example, the user may turn off the indicator light, but then other road users are unaware that the user of the vehicle intends to turn across their path.

Furthermore, reducing distractions allows vehicle operators to focus on making decisions core to the operation of the vehicle—acceleration, braking, steering, and indication of intended direction to other users.

CLARIFICATIONS

In this specification, where a document, act or item of knowledge is referred to or discussed, this reference or discussion is not an admission that the document, act or item of knowledge or any combination thereof was at the priority date:

(a) part of common general knowledge; or (b) known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps.

BRIEF DESCRIPTION OF THE DRAWINGS

In order to enable a clearer understanding, a preferred embodiment of the technology will now be further explained and illustrated by reference to the accompanying drawings, in which:

FIG. 1 is a simplified schematic diagram of a decision tree relating to an embodiment of the present technology;

DETAILED DESCRIPTION OF AN EXAMPLE EMBODIMENT

Figure 2:
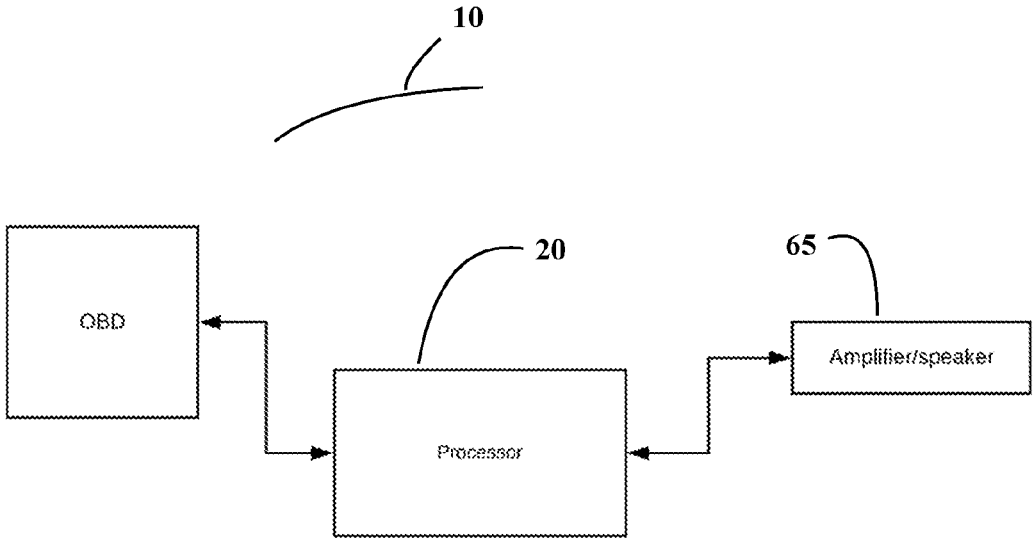
FIG. 2 is a schematic diagram of a system of an embodiment of the present technology.

Referring to the drawings there is generally indicated at 10 a vehicle alert management system (FIGS. 2, 3 and 4) and a method 99 which may be implemented by those embodiments of the system 10 (FIGS. 1 and 5) that manages alert lights and/or tones in accordance with vehicle speed.

The arrangement is such that in use the alert management system 10 allows an alert light and/or tone to emanate from a lamp or an audio system at least initially, but after a selected time, switches off the light, or mutes the alert tone, or attenuates the alert tone, if the system 10 detects that the vehicle speed is below a selected threshold, or if the system 10 detects no change to the vehicle speed outside a threshold speed range, or other suitable speed algorithm.

The vehicle alert lights and tones managed by the system 10 and method 99 are several, and include: left/right turn indicator alert; reversing alert; parking sensor (proximity sensor) alert; other proximity alert.

Figure 3:
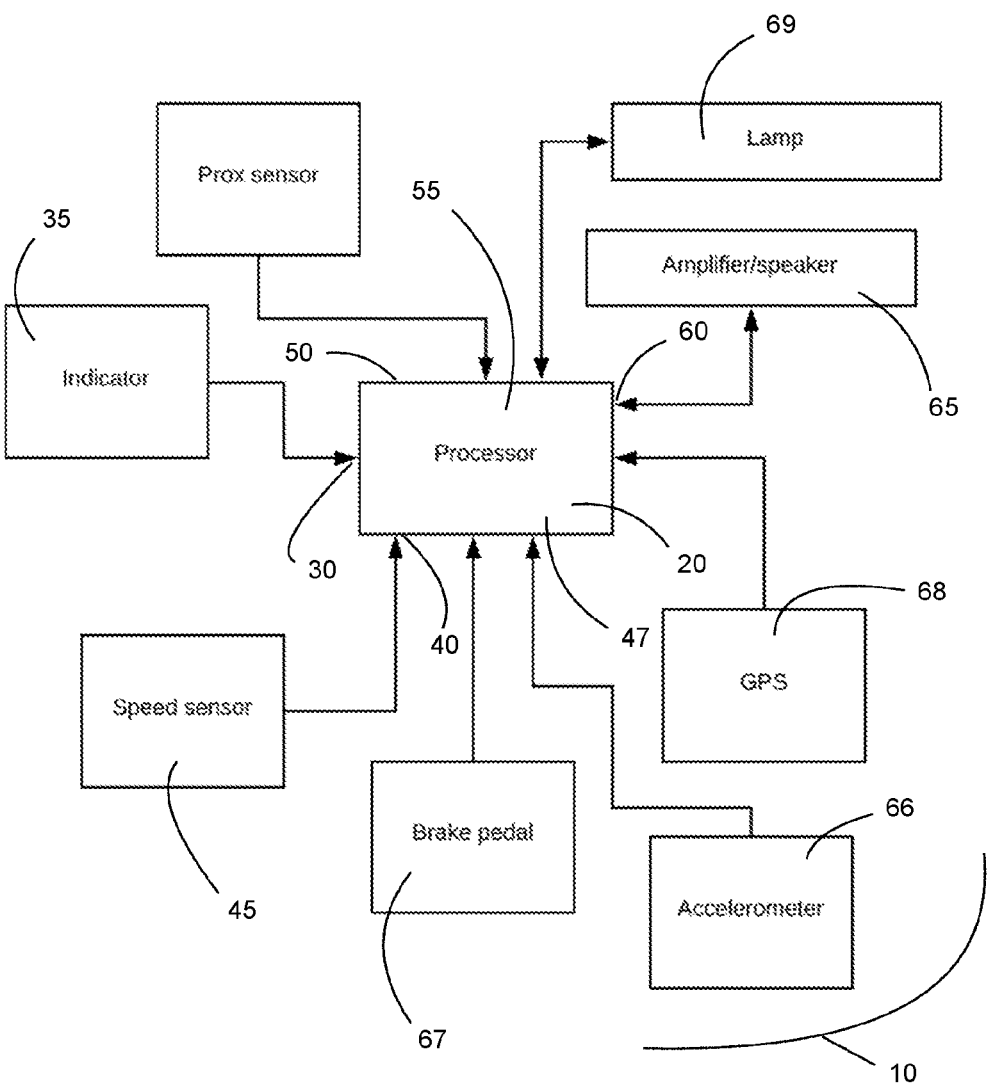
FIG. 3 is a schematic diagram of a system of another embodiment of the present technology.
Figure 4:
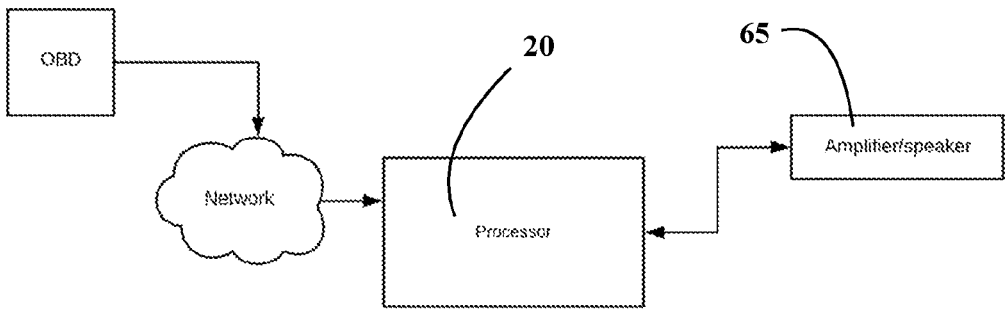
FIG. 4 is a schematic diagram of a system of still another embodiment of the present technology.

It can be seen in FIGS. 2, 3 and 4, embodiments of the system 10 for turning off the alert lamps or lights or screen area, and muting or attenuating sound relating to a vehicle signal or alarm.

The system 10 includes a computer processor 20 which has one or more data inputs 30 relating to a user actuator such as a turn indicator—not shown—for a vehicle operation such as turning. The computer processor 20 may include a flashing circuit which causes a lamp such as a bulb 69 to turn on in a selected pattern or sequence—generally, flashing on and off, every second or so. The lamp could be a bulb 69 or plurality of lamps such as an LED group, and/or a display region on a display screen. Turn signal display module in computer processor 20 operates the bulb 69 or LED group or display region on a display screen. The computer processor 20 is configured to attenuate or inhibit the turn signal display on the display screen or inhibit power to the flashing circuit for a selected period of time or inhibit power to the bulb 69 for a selected period of time.

The computer processor 20 is also configured to switch power off for a selected period of time to the amplifier 65 which amplifies the audio signal from the flashing circuit.

The data inputs 30 may be directly connected to a turn indicator stalk or may be connected to an OBD (on board diagnostic) plug which may relay data relating to turn indication to the processor 20.

The various modules, logic and components of the technology may be provided by a processor or other hardware or firmware components of a vehicle. One or more of the modules may also be embodied as a circuit. The processor itself may include the vehicle OBD, so that the processing relating to the silencing of the turn signal may be conducted on board the car's actual diagnostic or management system; or it may be a separate and standalone processor 20 such as an aftermarket unit with a network module so as to detect an audio signal in the cabin with a microphone, or configured to detect a wireless or wired signal relating to speed and turn signalling alerts.

Generally speaking, a computer program product in accordance with one embodiment comprises a tangible computer usable medium (RAM, USB drive, or like technology) having computer readable code embodied therein, wherein the computer readable code is configured to be executed by a processor working in connection with an operating system to implement one or more functions as described hereinbelow. The code may be written in any suitable language including C, C++, Java, and the like.

The processor 20 may be implemented as multiple processors and/or sub processors, wirelessly or connected physically with wires or PCB tracks. There may be storage connected to the processor so that the processor can retrieve algorithms for inhibiting or attenuating or otherwise managing cabin audio or light signals.

It may alternatively be that the alert tone from the actuation of the turn indicator is sensed from a microphone which is disposed on board or connected to the system or processor 20.

There is also in the system 10, one or more data inputs 40 to the computer processor 20 relating to a vehicle's speed (or directly or indirectly from a speed sensor 45). The speed may be input to the processor via an onboard GPS 47 (on board to processor 20) or from a network card or from an OBD (on board diagnostic) plug, the latter two of which are configured to obtain their input from an OBD processor.

The system 10 further includes one or more data inputs 50 to the computer processor 20 from a timer or an internal timer 55, and a data output 60 to a sound amplifier 65 or sound system or speaker. A secondary speed sensor may provide data input, which may be a GPS unit 68. A brake pedal 67 may provide data input to the computer processor 20. Further, an accelerometer 66 may provide data input to the computer processor 20, to provide data on whether the car is oriented the right way round, or upside down, or in an emergency braking situation.

The computer processor 20 is configured to transmit from the data output 60 a sound-inhibiting command to the amplifier 65 or sound system or speaker if the processor 20 receives data relating to the speed sensor 45 and timer 55 that the speed of the vehicle has been below a selected threshold for a selected period of time, or if the computer processor calculates that the speed data sensed by the speed sensor 45 has been within a selected threshold speed range over a selected period of time, or in accordance with another suitable speed algorithm.

The speed thresholds are contemplated as being, a set speed. In one example, the set speed threshold is 10 km/h. That is, if the speed is below 10 km/h, in operation the computer processor 20 sends a turn signal attenuation command to the sound system or speaker or amplifier 65 after it receives data from the timer that the turn indicator tone has been in operation for 10 seconds. If speed is above 10 km/h, then the computer processor 20 sends a command that any turn signal alert may be played by the sound system or speaker 65. The timer 55 is also reset, so that the actuation data may pass through to the amplifier when it is next actuated.

There are other thresholds, which may be a band of speed. If the speed of the vehicle remains within the same 10 km/h band in which the turn signal was actuated, then the computer processor 20 sends a turn signal tone attenuation command to the sound system or speaker or amplifier 65 after it receives data from the timer that it has been actuated for ten seconds.

EXAMPLE

Figure 5:
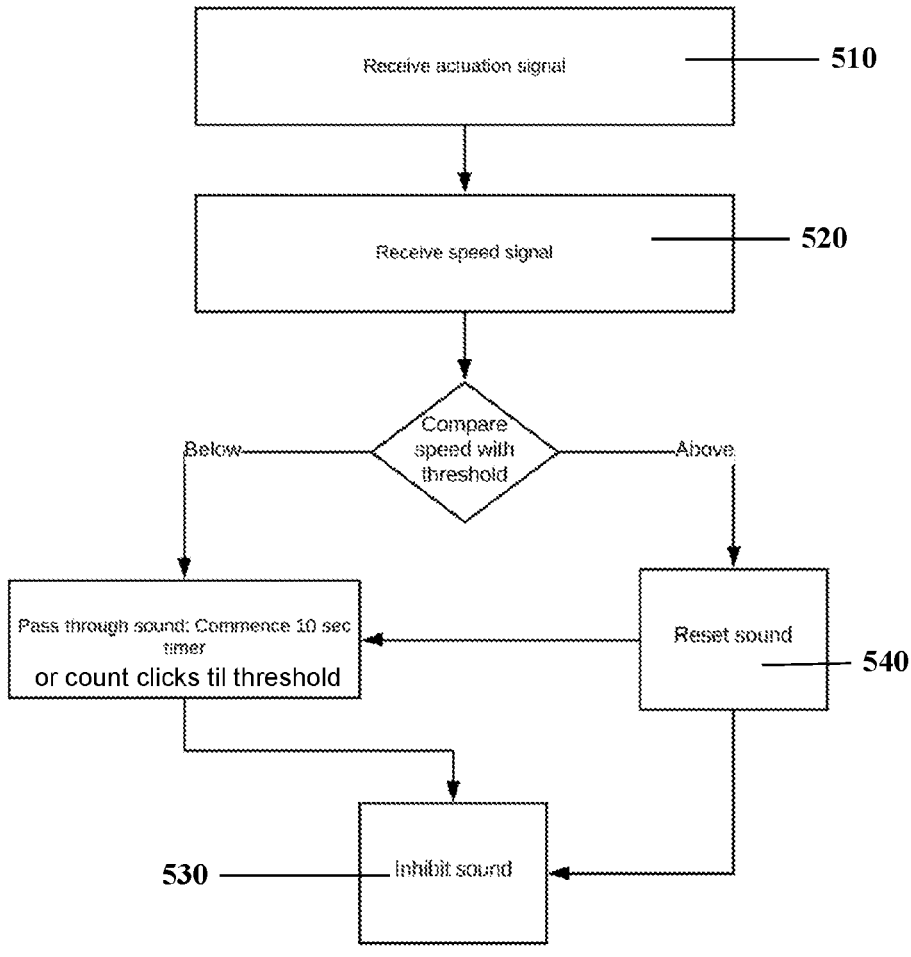
FIG. 5 is a flow chart of the decisions and steps of an embodiment of the method of the present technology.

There can be seen in FIG. 5, the steps in an example method of turning off lights, muting sounds, and/or attenuating sound relating to a vehicle signal or alarm. We will discuss the elements in that method now. First, there is the step of receiving data, in a computer processor 20, from a signal actuator for a vehicle action. The action in this instance is a vehicle turn and the signal actuator is a turn signal. The receiving data step is shown at 510.

Then there is the step, shown at 520, of receiving data, in a computer processor 20, from a speed sensor.

Next, there is the step, shown at 530, of sending a signal from the computer processor 20 to a light 69, and a sound system or speaker or amplifier 65 to inhibit a cabin lamp and a cabin sound related to the signal actuator, based on a selected change in vehicle speed over a selected time period. As discussed above, the threshold change in speed may be 10 km/h.

88. There may also be other threshold speed variations, including a difference of 1 km/h, 2 km/h, 3 km/h, 4 km/h, 5 km/h, 15 km/h, 20 km/h, 25 km/h, 30 km/h, 35 km/h, 40 km/h, 50 km/h, 60 km/h.

There may also be other threshold speed ranges which may cause the computer processor to take action to inhibit the sound signal, including 0-10 km/h, 10 20 km/h, 20-30 km/h, 30-40 km/h, 40-50 km/h, 50-60 km/h and so on.

The method may further include the step of sending a pass-through command to the sound system or speaker or amplifier 65 if a further data signal is received from another signal actuator, such as for example if the left signal were actuated, for a long time, and the turn signal tone were attenuated by the computer processor 20, and then the right turn signal were actuated, the pass through command would be sent to the amplifier or sound system or speaker 65 to allow the turn signal alert tone to the amplifier and sound system or speaker 65.

Again, it may be seen in FIG. 5 that there is included the step of sending a passthrough command to the sound system or speaker 65 or amplifier if the computer processor 20 calculates that the speed data from the speed sensor 45 is outside the selected threshold speed range. This has the effect of resetting the turn signal alert as shown in step 540.

While it is not shown in FIG. 5, it can be understood that the step of 550 can be omitted such that in operation the computer processor 20 may be configured to transmit from the data output, a sound inhibiting command to the amplifier or sound system or speaker if the processor receives data from the timer 55 that a selected time period has elapsed since the actuator for the vehicle operation was actuated, whether or not the speed has changed.

The arrangement of the system may be such that the processor is attached to a car as an aftermarket unit, and in that unit the computer processor may be an intel chip, or a Raspberry Pi, or an Arduino chip, Atmega328p, MSP430, STM32, ESP32 or others. The computer processor 20 may also be a PLC. The MCU may include a network module so as to interface wirelessly or in a wired way with the OBD or other elements. For example, a signal from the turn signal actuator may be presented wirelessly (via a Bluetooth network unit wired into the turn signal actuator at the stem base, for example).

The data from the signal actuator may be directly sent to the inlet port from the actuator or the computer processor 20 may be attached to an outlet port of a computer processor which directly manages vehicle operations. In that instance, the computer processor 20 may receive data relating to the signal actuator from the computer processor manager of vehicle operations, rather than from the signal actuator itself.

There is also a re-introduction algorithm which is implemented by one or more modules in the processor 20. The re-introduction algorithm implements a method including the steps of: recording the time of alert commencement; commencing a timer from the time of alert receipt; silencing the alert for a selected period of time; and then increasing the volume of the alert after the selected period of time or after a threshold speed range has been exceeded.

The reintroduction algorithm method includes the step of assigning a weight to selected alerts for use in an alert prioritisation algorithm. The method includes the step of implementing an alert prioritisation algorithm such that alerts with a higher weighting are re-activated before other alerts. The method includes the step of reactuating alerts with a higher weight earlier than alerts with a lower weighting. The method includes the step of silencing alerts with a lower weight for longer than alerts with a higher weighting in the alert prioritisation algorithm.

The indicator alert has a high weighting in the alert prioritisation algorithm, being 0.5 in the alert prioritisation algorithm; a hazard light alert has a weighting of 0.8 in the alert prioritisation algorithm, a proximity alert has a weighting of 0.9 in the alert prioritisation algorithm. The algorithm re-actuates alerts after a selected number of seconds and then re-silences the alerts after another selected number of seconds.

The processor 20 records the number of re-actuations and reduces the silencing time between them unless there has been a change in one of the recorded conditions relating to that alert, such as for example, threshold speed range, or temperature, or steering angle, or proximity to another vehicle.

10

Figure 6:
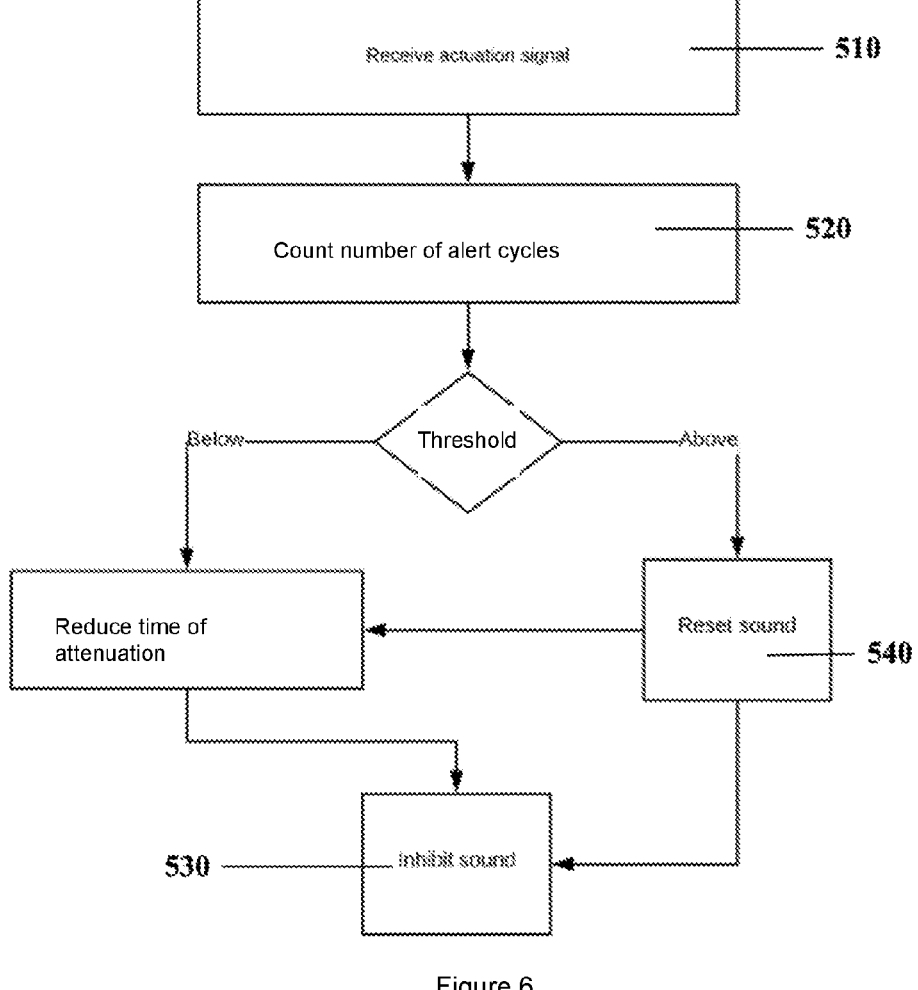
FIG. 6 is a flow chart which shows a high level management of multiple sequential alert episodes and attenuation episodes.

In this way the processor 20 monitors a plurality of silencing events and by the reduction of the silencing time between alert episodes, and/or the reintroduction of certain alerts in a certain order, encourages the taking of some action in response to an alert tone. This is shown in FIG. 6.

CLARIFICATIONS

Modifications and improvements to the invention will be readily apparent to those skilled in the art. Such modifications and improvements are intended to be within the scope of this invention.

The invention claimed is:

1. A vehicle alert management system that manages an actuated vehicle alert comprising a signal or alarm; the system comprising:
a computer processor;
one or more data inputs to the computer processor relating to a user actuator for a vehicle operation;
one or more data inputs to the computer processor relating to a speed sensor;
one or more data inputs to the computer processor from a timer or an internal timer; and
a data output to a light actuator, sound amplifier or sound system or speaker that causes the signal or alarm;
the computer processor being configured to transmit an inhibiting command from the data output to the light actuator, the sound amplifier, or the sound system, or the speaker to inhibit the signal or alarm if the processor receives data relating to the speed sensor and timer that vehicle speed has been below a selected threshold for a selected period of time, or if the computer processor calculates that speed data from the speed sensor has been within a selected threshold speed range over a selected period of time,
wherein the inhibiting command corresponds to the signal or alarm, and
wherein the inhibiting command is generated only after the corresponding alert or signal has been activated, without requiring a change in the condition that originally triggered the signal or alarm.

2. The system in accordance with claim 1, wherein the computer processor is further configured to send a passthrough command to the light actuator, sound system, sound amplifier, or speaker if a further data signal is received from another signal actuator.

3. The system in accordance with claim 1, wherein the computer processor is further configured to send a passthrough command to the sound system or speaker or amplifier if the computer processor calculates that the speed data from the speed sensor is outside the selected threshold speed range.

4. The system in accordance with claim 1 wherein the computer processor is further configured to send a passthrough command to the sound system or speaker or amplifier if the computer processor calculates that the inhibiting command has been inhibiting the sound for more than a selected time period.

5. The system in accordance with claim 1, wherein the computer processor is further configured to receive data from a speedometer or an onboard GPS to inform the decision relating to sound inhibiting by the computer processor.

6. The system in accordance with claim 1, wherein the computer processor receives data from a brake pedal sensor, steering wheel sensor, accelerator sensor, or an onboard compass or onboard gyroscope, to calculate whether a vehicle action has been taken to inform the sound inhibiting command decision.

7. The system in accordance with claim 1, wherein the data inputs are from an OBD (on board diagnostic) system or onboard management module via a plug or network module.

8. The system in accordance with claim 7, wherein the data inputs are via a wireless or wired network module which is connected directly or indirectly to the OBD plug or onboard vehicle management module.

9. The system in accordance with claim 8, further comprising a network module for communication with the OBD or onboard vehicle management module.

10. The system in accordance with claim 7, wherein the computer processor is further configured to perform a step of attenuating, increasing or muting the selected alert after a selected number of dings, tocks, ticks, beeps, clangs, or other sound events.

11. The system in accordance with claim 1, further comprising an OBD or onboard management module interface plug or socket.

12. The system in accordance with claim 1, wherein the computer processor is further configured to monitor:

alert tone noise with a microphone.

13. The system in accordance with claim 1, further comprising:

recording in the computer processor a length of time that a selected alert has been in operation.

14. The system in accordance with claim 1, wherein the computer processor is further configured to transmit attenuation commands to an amplifier to decrease and/or mute the noise from the sound amplifier, after about 5 seconds, or about 10 seconds, or about 15 seconds, or about 20 seconds, or about 30 seconds.

15. The system in accordance with claim 1, wherein the computer processor is further configured to receive data from a microphone to record a number of repetitive noise events, the repetitive noise events selected from a tick, beep, tock, dong, and a clang.

16. The system in accordance with claim 1, wherein the computer processor is further configured to perform steps of:

recording in a processor a time of alert commencement;

commencing in a processor a timer from the time of alert receipt;

silencing by use of a processor module the alert for a selected period of time;

recording and assessing in a processor module the speed of the vehicle; and then increasing the volume of the alert after the selected period of time or after a threshold speed range has been exceeded.

17. The system in accordance with claim 1, wherein the computer processor is further configured to perform a step of assigning a weight to selected alerts for use in an alert prioritisation algorithm.

18. The system in accordance with claim 1, wherein a threshold speed variation to cause the processor to take action to inhibit the cabin light or sound signal is within a difference of 10 km/h, or 1 km/h, 2 km/h, 3 km/h, 4 km/h, 5 km/h, 15 km/h, 20 km/h, 25 km/h, 30 km/h, 35 km/h, 40 km/h, 50 km/h, 60 km/h.

19. The system in accordance with claim 1, wherein a threshold speed range to cause the computer processor to take action to inhibit the cabin light or sound signal, is inside the range of 0-10 km/h, or 10-20 km/h, or 20-30 km/h, or 30-40 km/h, or 40-50 km/h, or 50-60 km/h.

20. The system in accordance with claim 1, wherein the vehicle speed is detected as below 10 km/h for at least 5 or at least 10 seconds.

\* \* \* \* \*